(No Model.) 2 Sheets—Sheet 1.
W. TENNISON.
BAND CUTTER AND FEEDER FOR THRASHERS.
No. 344,145. Patented June 22, 1886.
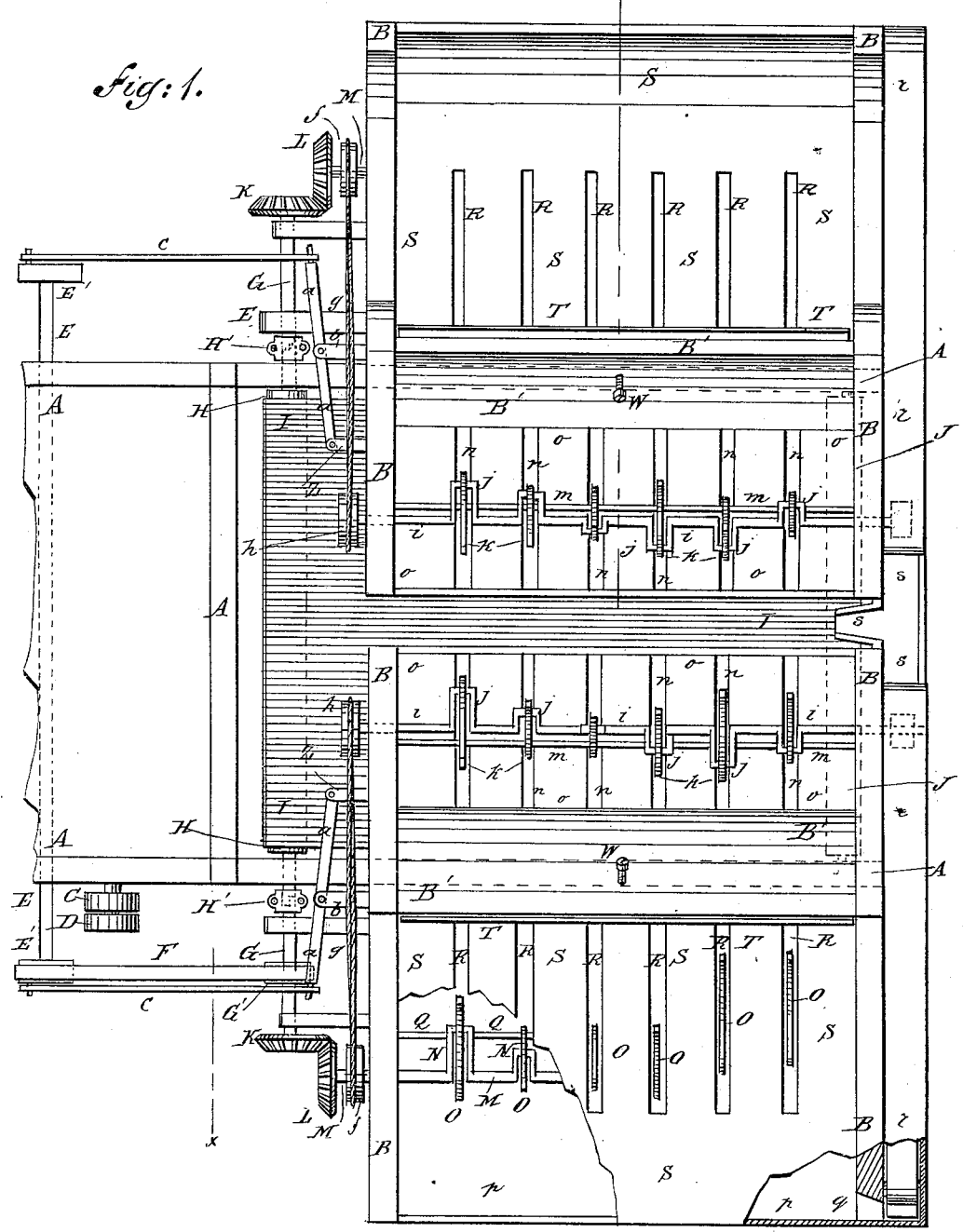
Fig: 1.
WITNESSES:
INVENTOR:
W. Tennison
BY Munn & Co
ATTORNEYS.

(No Model.) 2 Sheets—Sheet 2.
W. TENNISON.
BAND CUTTER AND FEEDER FOR THRASHERS.
No. 344,145. Patented June 22, 1886.
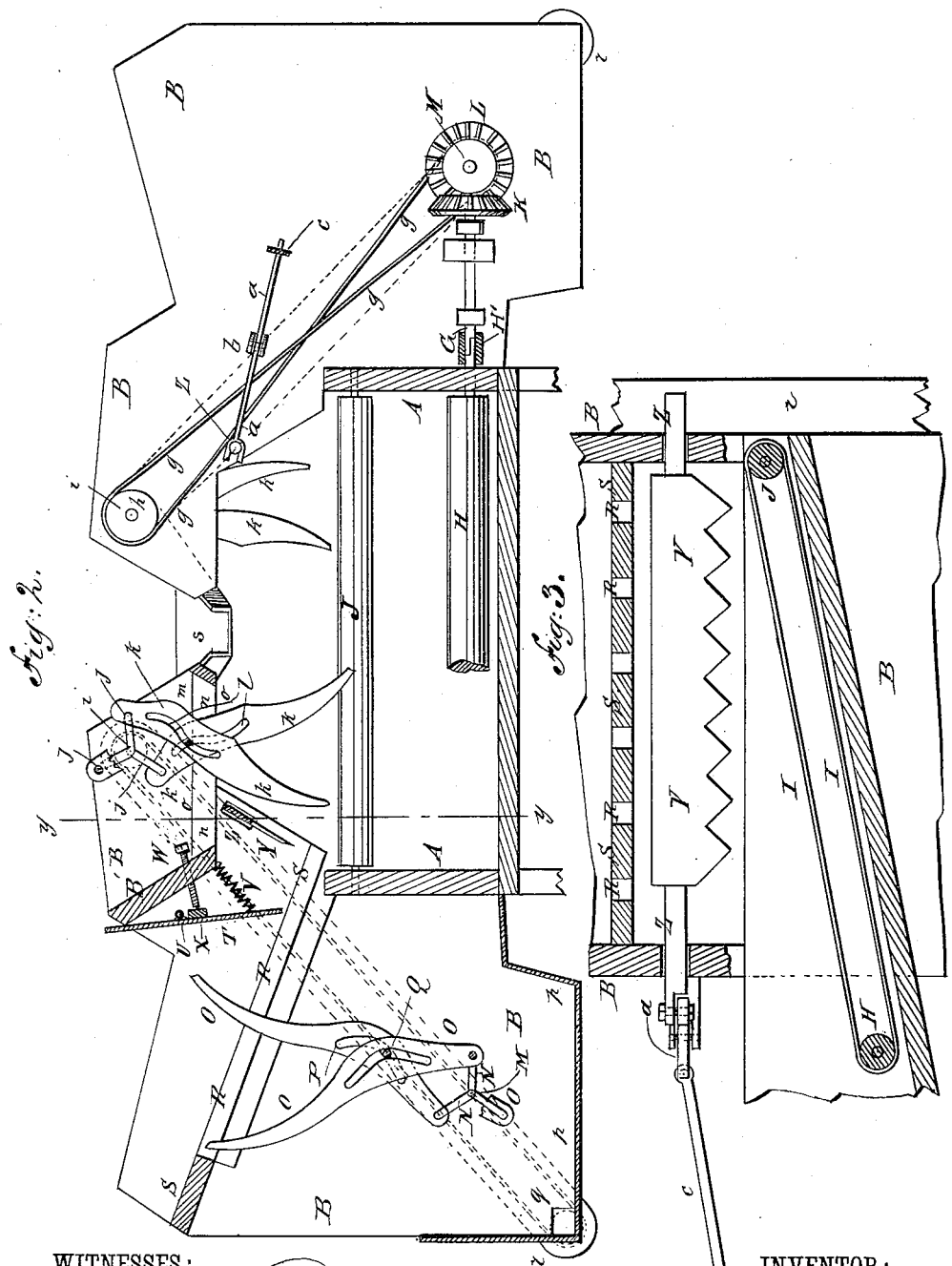
WITNESSES:
INVENTOR:
W. Tennison
BY Munn & Co
ATTORNEYS.

UNITED STATES PATENT OFFICE.

WILLIAM TENNISON, OF MOUNT VERNON, INDIANA.

BAND-CUTTER AND FEEDER FOR THRASHERS.

SPECIFICATION forming part of Letters Patent No. 344,145, dated June 22, 1886.

Application filed October 1, 1885. Serial No. 178,706. (No model.)

*To all whom it may concern:*

Be it known that I, WILLIAM TENNISON, of Mount Vernon, in the county of Posey and State of Indiana, have invented certain new and useful Improvements in Band-Cutters and Feeders for Thrashers, of which the following is a full, clear, and exact description.

Reference is to be had to the accompanying drawings, forming part of this specification, in which similar letters of reference indicate corresponding parts in all the figures.

Figure 1 is a plan view of my improved band-cutter and feeder, shown as applied to a thrashing-machine, parts being broken away. Fig. 2 is an elevation of the same, partly in section, through the line $x$ $x$, Fig. 1. Fig. 3 is a sectional elevation of the same, taken through the line $y$ $y$, Fig. 2.

The invention consists in the construction and combination of various parts of the feeder and band-cutter, as will be hereinafter fully described, and then pointed out in the claims.

The combined band-cutter and feeder can be placed at either or both sides of the feed-hopper of the thrashing-machine, as may be desired. The latter arrangement is illustrated in the drawings.

A represents a portion of a frame of a thrashing-machine, to the forward part of the frame of which is secured the casing B of the combined band-cutter and feeder. To a journal of the cylinder of the thrashing-machine A are attached a fast pulley, C, and a loose pulley, D, to receive a driving-belt. To a shaft, E, of the thrashing-machine is attached a crank-wheel, E', to receive a belt, F, which also passes around a pulley, G', attached to the shaft G. The shaft G revolves in bearings attached to the forward part of the casing B and is connected by an ordinary shaft-coupling, H', to the journal of the roller H, journaled in the forward part of the frame of the thrashing-machine, around which roller passes the lower part of the endless feed-apron I. The upper part of the endless feed-apron I passes around a roller, J, journaled to the forward end of the frame of the thrashing-machine A, so that the said endless apron will carry the grain to the cylinder of the thrashing-machine.

To the end of the shaft G is attached a bevel gear-wheel, K, the teeth of which mesh into the teeth of the bevel gear-wheel L, attached to the end of the shaft M. The shaft M is journaled in bearings in the casing B and upon it are formed eight (more or less) cranks, N, projecting in different directions, and to which are pivoted the lower ends of the lower feeder-arms, O. The middle parts of the arms O are widened and have curved slots P formed in them, through which passes the shaft Q, to serve as a fulcrum to the said arms. The slots P allow the arms O to move up and down, and the fulcrum-shaft Q, in connection with the curvature of the slots P, causes the upper ends of the said arms to move upward, forward, downward, and backward as the crank shaft M N revolves. The upper ends of the arms O in their upward and forward movements move through slots R in the inclined feed-table S, secured in the upper part of the casing B, so that the said arms in their forward movement will feed the bundles of grain or clover seed down the said feed-table and in their rearward movement will pass beneath the said bundles. Near the lower end of the feed-table S the bundles pass beneath the lower edge of a plate, T, attached at its upper part to a shaft, U, journaled to the sides of the casing B. The lower edge of the plate T is held down near the feed-table S by a spiral spring, V, the lower end of which is attached to the said plate near its lower edge. The upper end of the spring V is attached to a cross-bar, B', of the casing B. The movement of the plate T, and consequently the rapidity of feed, is regulated and the machine is adapted to feed damp or dry grain by a set screw, W, which passes through the cross-bar B' of the casing, and against the forward end of which the plate T, or a block or bar, X, attached to the said plate, strikes. As the bundles pass out from beneath the lower edge of the plate T they come in contact with and their bands are cut by the V-shaped teeth of the cutter Y, attached to the bar Z, the ends of which slide in bearings in the casing B. To the inner end of the bar Z is pivoted the end of a lever, $a$, which is pivoted at its middle part to a support, $b$, attached to the casing B. The other end of the lever $a$ is pivoted to the upper end of a pitman, c, which is pivoted at its other end to the crank-wheel E', attached to the shaft E, so that the cutter Y will be vibrated to cut the bands by the revolution of the said shaft E.

To the crank-shaft M N is attached a pulley, f, around which passes a belt, g. The belt g is crossed, and passes around a pulley, h, attached to the shaft i, which revolves in bearings in the upper part of the casing B, and upon which are formed eight (more or less) cranks, j, projecting in different directions.

To the cranks j are pivoted the upper ends of the upper feed-arms, k, the middle parts of which are widened and have curved slots l formed in them to receive the rod m. The rod m at its ends is attached to the casing B, is passed through the slots l of the feed-arms k, and serves as a fulcrum to the said feed-arms. With this construction, as the crank-shaft i j is revolved, the lower ends of the upper feed arms, k, are moved upward, outward, downward, and inward, and the crank-shaft i j and fulcrum-rod m are so arranged that the lower ends of the said upper feed-arms, k, will move downward close to the cutter Y, so as to take the grain as it passes the said cutter and feed it evenly and regularly over the endless feed-apron I, by which it is carried to the thrashing machine A.

The feed-arms k are held from lateral movement by passing through slots n in a table, o, attached to the casing B.

Any kernels of grain that may pass through the slots R of the feed-table S fall into a chamber, p, in the lower part of the casing B, and slide through an opening, q, in the lower outer part of the casing B in the well of an elevator, r, by which they are carried up and discharged upon the spout s. The kernels of grain from the spout s fall upon the endless feed-apron I and pass into the thrashing-machine with the grain to be thrashed.

The elevator r is driven from the crank-shaft i, as indicated in Figs. 1 and 2.

Having thus described my invention, what I claim as new, and desire to secure by Letters Patent, is—

1. The combination of the endless feed-apron I, the slotted feed-table S, the set of vibrating arms O, for feeding the bundles down the said feed-table, the vibrating band-cutter Y, the set of vibrating arms k, for feeding the grain from the cutter to the said endless feed-apron, and a driving mechanism, as set forth.

2. The combination, with the slotted feed-table S, the set of vibrating arms O, and their driving mechanism, of the swinging gage-plate T, the holding-spring V, and the regulating-screw W, substantially as herein shown and described, whereby the passage of the grain from the said feed-table is regulated, as set forth.

3. The combination, with the endless apron I, the slotted feed-table S, and a driving mechanism, of the chamber p, the elevator r, and the spout s, substantially as herein shown and described, whereby the kernels of grain falling through the slots of the feed-table are carried to the thrashing-machine, as set forth.

WILLIAM TENNISON.

Witnesses:
 FRANCIS ALLYNE,
 W. R. WEEVER.